Patented Jan. 28, 1941

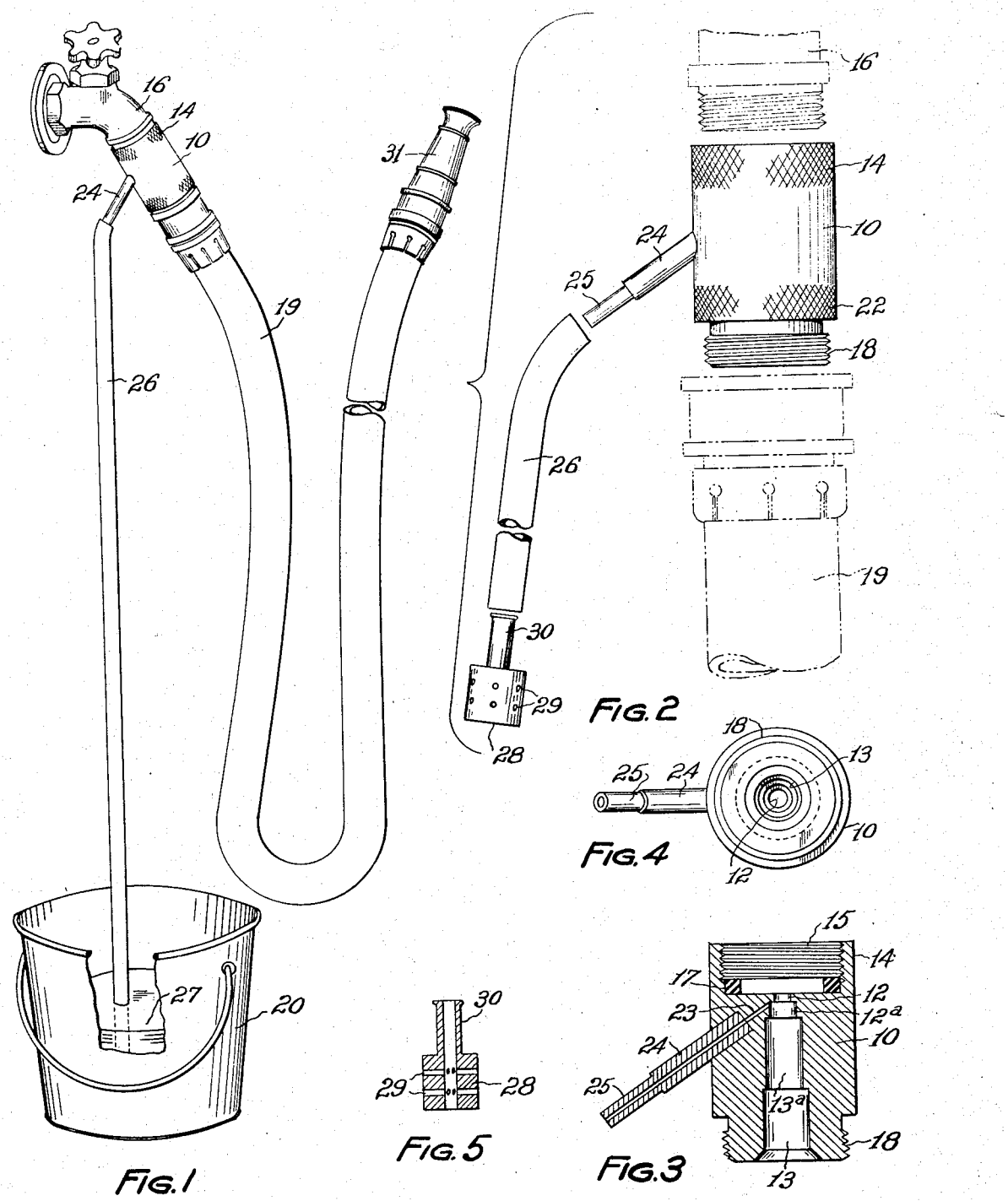

2,230,201

UNITED STATES PATENT OFFICE 2,230,201

HOSE COUPLING

Louis Hermann, Cleveland, Ohio, assignor to The Four Power Company, Cleveland, Ohio Substitute for abandoned application Serial No. 263,690, March 23, 1939. This application March 16, 1940, Serial No. 324,252

1 Claim. (Cl. 103—262)

This invention relates to couplings and devices used to connect a garden hose to a water faucet and particularly to aspirator couplings which may be used for mixing liquid fertilizers with the water passing through the hose.

This application is a substitute for my abandoned application which was filed March 23, 1939 and known as Serial No. 263,690.

The primary object of the invention is to provide a simple economical device which facilitates the mixing of liquids.

Another object is to provide a device of the character described which is stationary, out of the way, and which does not interfere with the ordinary manipulation of the hose.

A further object is to construct such aspirator so that a proper suction will be maintained and which minimizes the possibility of back pressure or reverse flow.

These and other objects as well as a fuller understanding of the invention may be had by referring to the following description and claim together with the accompanying drawing in which like parts are designated by like reference characters and in which:

Figure 1 is a view of the device constituting this invention attached and ready to use;

Figure 2 is an enlarged view of the device showing parts disassembled;

Figure 3 is a vertical sectional view of the main element of the device;

Figure 4 is a bottom view of the device; and

Figure 5 is a vertical sectional view of the strainer element of the device.

The instant invention consists of a metal body member 10 which may be of a generally cylindrical shape. Extending axially through the body 10 there is a longitudinal channel formed of a series of interconnected ducts 12, 12a, 13 and 13a. The channel is somewhat tapered, that is, the admission opening or duct 12 is smaller than the discharge opening 13. The smallest duct 12 is about three-thirty-seconds of an inch in diameter and is about one-sixteenth of an inch long. Its diameter is about one-half that of its contiguous duct 12a and is also just about one-half as long. The next intermediate duct 13a has a diameter approximately twice that of the duct 12a and is about four times as long. It, too, is about as long as the adjacent lower duct 13 but is only about three-fourths as large in diameter.

The upper end of the body member, the end that abuts the water faucet 16 and which has the small duct 12, has an outer knurled surface 14 and an inner threaded means 15 for engagement with the related threads of the faucet 16. The lower end of the body member, the end that receives the garden hose 19, is provided with a similar outer knurled surface 22 and has a male thread 18 thereon for connection to the hose attaching member. The top end 14 of the body member 10 is also provided with a simple rubber washer 17 just below and within the threaded portion 15.

The inspiratory nozzle consists of a short piece of pipe 24 which fits into an angular hole in and which is firmly attached to the body member. This pipe 24 connects with the duct 23 which in turn opens into the channel duct 12a. The inspiratory duct 23 enters into the aspiratory channel duct 12a also at an angle but which angle must be any angle other than a right angle.

The free end 25 of the inspiratory nozzle pipe 24 is provided with means, such as the narrowed portion 25, for accommodating a rubber tube or flexible conduit 26. The tube reaches down into the container or pail 20, the lower end 26 of which is provided with a small strainer 28. The strainer 28 is also made of metal. It consists of a hollow cup-like element in which there are several radial holes 29. Extending upward from the cup-like element and attached thereto is the tubular neck portion 30 to facilitate engagement with the rubber tube or conduit 26.

In operation, after the various parts are assembled as illustrated and the fertilizing mixture or fluid 27 is in the pail or container 20, the water faucet 16 is turned on. As the water passes through the body member 10 its pressure decreases because of the constantly enlarging channel 11. It thereby causes a suction which draws the fertilizing fluid up and through the conduit 26, the inspirator nozzle 24 and the duct 23, mixing it uniformly with the water. The water so treated is sprayed out of the garden hose nozzle 31 in the most convenient, even and efficient manner.

The size of the body member 10 and the design of the tapered channel 11 and the duct 23 is suitable for ordinary purposes substantially as illustrated in the drawing. With this construction, it has been found in practice that a fertilizing fluid made of one pound of ammonium sulphate dissolved in one gallon of water will be satisfactory and will not burn a lawn or harm the most delicate foliage. The ammonium sulphate, which incidentally is particularly desirable for use with this device because of its high nitrogen content and moderate price, is emitted at approximately the rate of one ounce per gallon of fluid sprayed through the garden hose nozzle.

One of the advantages of this device is that it permits the user to manipulate the garden hose in the same manner that he would without the attachment. There are no moving or cumbersome parts or accessories to carry around. Another advantage is that the device may be easily rinsed or cleaned by simply closing the nozzle 31 of the hose 19 so that clean water is forced out through the duct, aspirator, conduit and strainer. By permitting clear water to run through the device and the hose for a few minutes after the fertilizing fluid has passed through, all trace of any elements which might be injurious to the rubber of the hose will be removed.

Another advantage found in the instant device is that the systematic arrangement of the series of ducts 12, 12a, 13 and 13a and the introduction of the inspiratory duct 23 therein permits a rather wide range of water pressures to work successfully with the device. Heretofore, if the main water line pressure was too great or if the spray or constriction member of the nozzle member 31 was too fine, the water of the main hose had a tendency to back up and run into the fertilizer pail. It has been found in practice that by constructing the aspirator coupling as herein described, there is less of a tendency to cause a reverse flow of the water.

It will now be clear that there is provided by this invention a hose coupling which accomplishes the objects of the invention. While the invention has been described in a specific form and while certain special terms and general langauge have been used, it is to be understood that the embodiment of the invention as described and shown is suggestive only and is not to be considered in a limiting sense. It is to be further understood that there may be other forms or adaptations of the device and those modifications are also considered to be within the broad scope of the invention as no limitations upon it are intended other than those imposed thereon by the scope of the appended claim.

I claim:

An aspirator coupling adapted to be interposed between a faucet and a garden hose, comprising in combination, a body member having a channel portion extending longitudinally therethrough opening into the said faucet and hose and including a series of interconnected ducts, the said series of ducts consisting of four longitudinally aligned ducts each having parallel wall surfaces, the first of the said ducts being approximately $\frac{1}{16}$ of an inch long and $\frac{3}{32}$ of an inch in diameter, the second of the said ducts being approximately $\frac{1}{8}$ of an inch long and $\frac{1}{16}$ of an inch in diameter, the third of the said ducts being approximately $\frac{1}{2}$ of an inch long and $\frac{3}{8}$ of an inch in diameter, and the fourth of the said ducts being approximately $\frac{1}{2}$ of an inch long and $\frac{1}{2}$ of an inch in diameter, and an inspiratory tube attached to the body member and opening into the said second duct adjacent to its connection with the said first duct.

LOUIS HERMANN.